Sept. 2, 1969  B. M. PETERS  3,464,629

GRASS AND WEED ERADICATING SPRAY UNIT

Filed Dec. 7, 1967

INVENTOR.
Byron M. Peters
BY
Webster & Webster
ATTYS.

United States Patent Office 3,464,629
Patented Sept. 2, 1969

3,464,629
GRASS AND WEED ERADICATING SPRAY UNIT
Bryon M. Peters, 235 W. Briggs Ave.,
Lathrop, Calif. 95330
Filed Dec. 7, 1967, Ser. No. 688,764
Int. Cl. B05b 1/28; A62c 11/04
U.S. Cl. 239—104                    9 Claims

ABSTRACT OF THE DISCLOSURE

A portable, hand-operated apparatus for spraying a grass and weed killing solution onto a confined area of definite size about a flush-mounted, lawn sprinkler head.

BACKGROUND OF THE INVENTION

As is well known to gardeners and lawn-keepers generally, it is necessary—when lawns are equipped with flush-mounted sprinkler heads—to manually clip away the grass from about the sprinkler heads every so often in order to prevent the grass from blocking their spray pattern. This is an inconvenient procedure and the present invention was conceived in an effort to alleviate such inconvenience.

SUMMARY OF THE INVENTION

The present invention provides, as a major object, a novel apparatus adapted to contain a supply of a suitable grass and weed killing solution, and by means of which apparatus such solution may be discharged in the form of a spray and directly onto the ground about a lawn sprinkler head adjacent which the apparatus is pre-positioned by the operator.

The present invention provides, as another object, an apparatus, as above, which includes a circular spray shield of larger size than a lawn sprinkler head, the shield being adapted to rest on the ground in surrounding and substantially concentric relation to such head, and a spray nozzle positioned to discharge into the shield and spray the entire area between the latter and said sprinkler head.

The present invention provides, as an additional object, an apparatus wherein the pressure necessary to produce the spray is created by means included in and functioning upon the apparatus being operated; a quantity of the grass and weed killing solution also being carried by the apparatus whereby the latter is wholly self-contained.

The present invention provides, as a further object, a grass and weed eradicating spray unit which is designed for ease and economy of manufacture, and convenience of use; the spray unit being lightweight, portable, and easily hand-operated.

The present invention provides, as a still further object, a practical, reliable, and durable grass and weed eradicating spray unit and one which is exceedingly effective for the purpose for which it is designed.

DESCRIPTION OF THE PREFERRED EMBODIMENT

Figure 1:
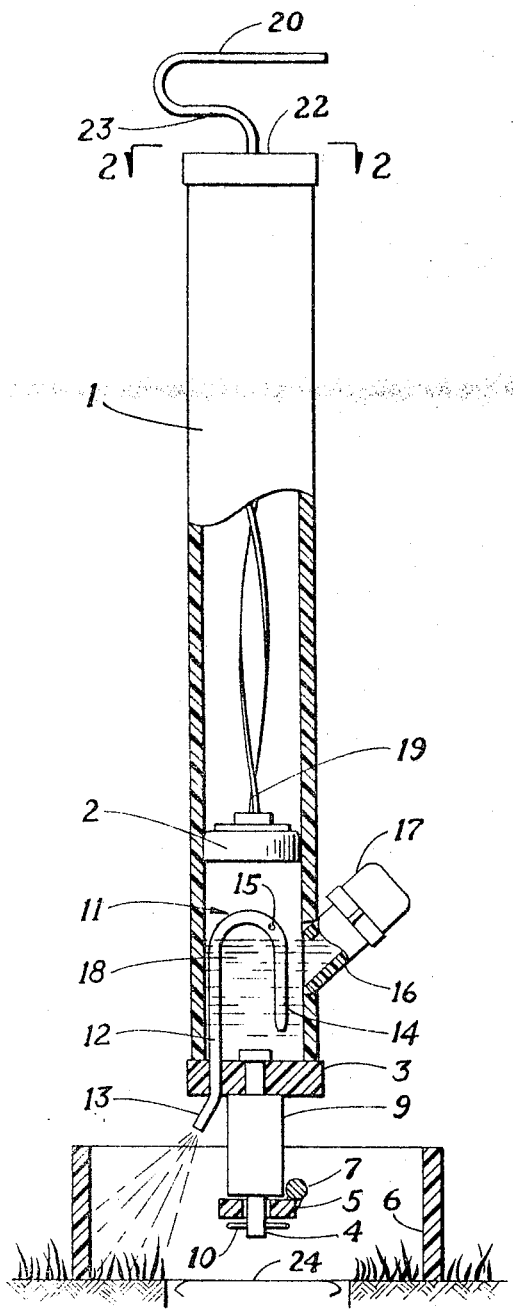
FIG. 1 is a side elevation of the spray unit partly broken out and in section; the unit being shown in an operating position, with the piston lowered.

Referring now more particularly to the drawings and to the characters of reference marked thereon, the spray unit comprises an upstanding air pump cylinder 1, similar to an ordinary hand-operated tire pump, and the piston 2 of which—when depressed or lowered—forces compressed air toward the lower portion of the cylinder. The base or bottom 3 of the cylinder 1 is a relatively thick and rigid member, from which a rigid pin 4 centrally depends.

The pin 4 projects with a loose, rotatable fit through a ring-like bearing member 5 which is located axially and within the confines of an upstanding circular spray shield 6; the diameter of such spray shield 6 being substantially greater than that of an ordinary sprinkler head. The bearing member 5 is fixed on one side to a half-circle bend 7 formed in a diametral cross shaft 8 which at its ends is turnably journaled in and projects through the spray shield 6 near its upper edge; the projecting ends of the cross shaft having speed nuts thereon as shown.

The spray shield 6 is held in spaced relation below the cylinder 1 by a rigid spacer sleeve 9 on the pin 4 and which spacer sleeve depends from a rigid connection with the bottom 3 to the bearing member 5 on which it rockably rests. The pin 4 is prevented from upward escape, from bearing member 5, by a cotter pin 10 extending through the lower end of said pin 4 and which cotter pin 10 is sufficiently below said member 5 to allow of some freedom of movement of said pin 4 and spacer sleeve 9 relative thereto.

A spray tube 11 of elongated inverted U-shape is mounted in connection with the bottom 3 of cylinder 1 and extends upwardly into said cylinder. One leg 12 of the tube is rigid with and projects through the bottom 3 and terminates therebelow in a depending spray nozzle 13 which is disposed radially of the spray shield 6 and extends at a downward and outward angle in the direction of the lower end of said shield. The other leg 14 of the tube depends to an open end termination relatively close to the top surface of the bottom 3. Adjacent its upper end, the leg 14 is provided with a small air passage opening 15.

The cylinder 1 is provided on the side with an upwardly and outwardly angled filler tube 16, normally closed by a removable but tight-fitting cap 17. The filler tube 16 is positioned on the cylinder 1 in a plane relative to the spray tube such that when a grass and weed killing solution 18 is poured into the tube 16 to a point of overflow therefrom, the level of the solution in the cylinder will be adjacent but below the air passage opening 15. The lower portion of the cylinder 1, i.e. from the bottom 3 upward to the above mentioned point of overflow, thus forms a reservoir for the supply of the solution 18.

Figure 2:
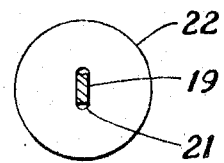
FIG. 2 is a cross section on line 2—2 of FIG. 1.
Figure 3:
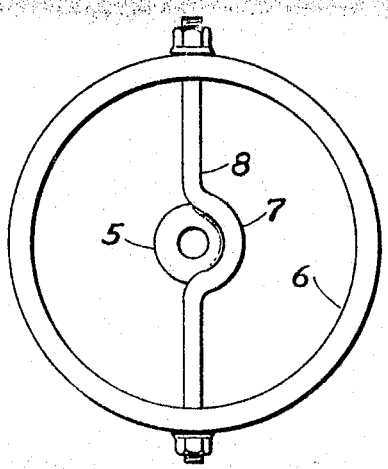
FIG. 3 is a plan view of the spray shield, detached.

The piston 2 is connected to a piston rod 19 which at its upper and exposed end is provided with a suitable handle 20. The piston rod 19 is of rectangular band form in section, and slidably passes through a similarly shaped slot 21 (see FIG. 2) in the cylinder head 22. Between the handle 20 and the piston 2 the piston rod 19 is of spirally twisted form as shown; the twist being such that upon a full downward movement of the piston rod 19 from a raised position mainly outside the cylinder and while holding the handle against rotation, the cylinder 1, including the spray nozzle 13, will be rotated at least 360 degrees. The length of the piston rod 19 is such that when the lower portion 23 of the handle 20 abuts against the cylinder head 22, and thus limits the downward movement of the rod and piston, the latter will still be clear of the upper end of the spray tube 11.

In operation, the spray unit is first manipulated—with the handle 20 and piston rod 19 raised relative to the cylinder 1—so that the spray shield 6 rests on the grass in symmetrically surrounding relation to a sprinkler head 24.

Then, upon pressing down on the handle 20 while holding the same against rotation, not only is the piston 2 lowered, but the cylinder 1 is rotated through no less than a full turn. Such lowering of the piston 2 compresses the air in the cylinder 1 ahead of the piston, causing the weed and grass killing solution 18 to be forced into the tube 11 and then out through the spray nozzle 13. During this passage of the solution it is mixed with air which enters through the opening 15, so that the solution—as it issues from the nozzle 13—is in the form of a misty spray. Due to the position or setting of the spray nozzle 13, as previously described, the spray is directed toward and onto all the grass within the spray shield. In this way the grass about a sprinkler head is caused to die and the spray pattern from such sprinkler head remains unobstructed.

The spray shield, of course, protects the grass beyond the shield from being contacted and killed by the solution.

After each spraying operation and upon the upstroke of the piston (which preferably occurs before the spray shield is lifted from the grass), air is sucked back through the opening 15 and thus there is no drip from the spray nozzle 13 when the spray unit is being moved from one position to another on a lawn.

In use of the spray unit the cylinder 1 does not have to remain exactly perpendicular since the loose fit of the pin 4 in the bearing member 5, in addition to the rockable mounting of the cross shaft 8 in the spray shield 6, permits of a certain amount of swivel or universal movement of the cylinder relative to said spray shield.

From the foregoing description, it will be readily seen that there has been produced such a grass and weed eradicating spray unit as substantially fulfills the objects of the invention, as set forth herein.

I claim:

1. A grass and weed eradicating spray unit comprising a spray shield adapted to ground-rest in surrounding relation to a flush-mounted sprinkler head, a supply of grass and weed killing solution carried by the spray unit, a spray tube leading from said supply to a point to discharge into the shield, and means on the spray unit operative to pressure-feed solution from said supply through the spray tube; said means comprising an air pump cylinder upstanding from and rotatably connected to the shield, the lower end portion of the cylinder forming a reservoir for the supply of the solution, the spray tube including a leg leading through the bottom of the cylinder to said discharge point, a piston in the cylinder above said reservoir, and means to lower the piston from a raised position and at the same time impart rotation to the cylinder.

2. A spray unit, as in claim 1, in which said piston lowering and cylinder-rotating means comprises a piston rod of non-circular form in section, and a head on the cylinder having a slot through which the piston rod matchingly and slidably extends; the piston rod being helically twisted to cause said rotation of the cylinder upon lowering of said piston rod from a raised position.

3. A spray unit, as in claim 1, in which the portion of said leg of the spray tube below the bottom of the cylinder forms a spray nozzle disposed radially of the cylinder with a downward and outward slope.

4. A spray unit, as in claim 1, in which the spray shield is circular; the cylinder being connected to the shield axially thereof and for swivel movement relative thereto.

5. A spray unit, as in claim 4, in which the cylinder and spray shield are connected by a diametrally disposed cross shaft journaled at opposite ends on the spray shield, a bearing member supported by the cross shaft centrally of its ends, a pin depending from the bottom of the cylinder axially thereof and projecting through the bearing, a spacer mounted on the pin between the bearing and said bottom of the cylinder, and means on the pin below the bearing preventing escape of said pin from the latter.

6. A spray unit, as in claim 1, in which said spray tube leg extends upwardly in said reservoir; the spray tube being of inverted U-shape and including another leg depending in the reservoir and terminating in an intake end adjacent but short of the bottom of the cylinder.

7. A spray unit, as in claim 6, with an air passage opening in the spray tube above the maximum level of the solution in said reservoir.

8. A spray unit, as in claim 7, in which the cylinder is formed with a filler tube projecting from the side thereof, and a removable cap on said filler tube; the point of overflow of such filler tube, when uncapped, being below said air passage opening.

9. A grass and weed eradicating spray unit comprising a spray shield adapted to ground-rest in surrounding relation to a flush-mounted sprinkler head, a supply of grass and weed killing solution carried by the spray unit, a spray tube leading from said supply to a point to discharge into the shield, and means on the spray unit operative to pressure-feed solution from said supply through the spray tube; the spray shield being continuous and of substantial height, and said means comprising an air pump cylinder upstanding substantially centrally above the spray shield, a conection between the bottom of the cylinder and the spray shield providing for rotation of said cylinder, the lower end portion of the cylinder forming a reservoir for the supply of the solution, the spray tube extending through said bottom of the cylinder from an intake point in the reservoir to said discharge point exteriorly of the cylinder, a piston in the cylinder above the reservoir, a piston rod attached to the piston, the cylinder having a slotted head through which the piston rod is movable, and a handle on the outer and exposed end of the piston rod; the cylinder head slot and the piston rod being formed and cooperating so that, upon a downward thrust of the piston rod to lower the piston and create the pressure which feeds the solution from the reservoir through the spray tube, the cylinder is caused to simultaneously rotate to an extent that the solution is sprayed into the spray shield and onto the grass all about the sprinkler head.

References Cited

UNITED STATES PATENTS 2,821,048    1/1958    Efford et al. _____ 239—104

FOREIGN PATENTS 97,333    11/1960    Norway.

EVERETT W. KIRBY, Primary Examiner

U.S. Cl. X.R.

239—288.3, 355, 361